(12) United States Patent
Kasperchik et al.

(10) Patent No.: US 7,576,199 B2
(45) Date of Patent: Aug. 18, 2009

(54) NEAR INFRARED DYES

(75) Inventors: Vladek Kasperchik, Corvallis, OR (US); Vyacheslav Olkhovik, Minsk (BY); Andreii Pap, Minsk (BY); Dmiitriy Vasilevskii, Minsk (BY); Cari L. Dorsh, Corvallis, OR (US); Sterling Chaffins, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 83 days.

(21) Appl. No.: 11/789,018

(22) Filed: Apr. 23, 2007

(65) Prior Publication Data

US 2008/0262222 A1   Oct. 23, 2008

(51) Int. Cl.
*C07B 47/00* (2006.01)
*C07D 487/22* (2006.01)

(52) U.S. Cl. .................................................... 540/145

(58) Field of Classification Search ........................ None
See application file for complete search history.

(56) References Cited

U.S. PATENT DOCUMENTS

| 5,047,312 | A | | 9/1991 | Albert et al. |
| 5,188,922 | A | | 2/1993 | Hayashida et al. |
| 5,232,757 | A | | 8/1993 | Kalyanaraman et al. |
| 5,460,646 | A | | 10/1995 | Lazzouni |
| 5,648,135 | A | | 7/1997 | Watanabe et al. |
| 5,916,481 | A | * | 6/1999 | Willey .................. 252/186.21 |

FOREIGN PATENT DOCUMENTS

| JP | 01093396 | * | 4/1989 |
| JP | 1110986 | | 4/1989 |
| JP | 2001221912 | * | 8/2001 |

OTHER PUBLICATIONS

March. Advanced Organic Chemistry, 1992, p. 250.*
International Search Report; PCT Patent Application No. PCT/US2008/061136, filed Apr. 22, 2008; search issued by Korean Patent Office (ISA) Sep. 5, 2008.

* cited by examiner

*Primary Examiner*—James O Wilson
*Assistant Examiner*—Noble Jarrell (57) ABSTRACT

Near infrared (NIR) dyes (e.g., formula I), image recording substrate including the NIR dye, and methods of making the NIR dyes, are disclosed.

15 Claims, 1 Drawing Sheet

NEAR INFRARED DYES

BACKGROUND

In general, near infrared dyes do not have high extinction in combination with good photostability. In addition, a few available near infrared dyes with reasonable photostability typically do not have good solubilities in UV-curable acrylate monomers or in polymer coatings used for labeling optical storage media. Lastly, vast majority near infrared dyes have pronounced visible signatures, which add an unwanted color to the coating in which it is used. Thus, there is a need to provide dyes that overcome at least some the disadvantages or deficiencies of current near infrared dyes.

SUMMARY

Briefly described, embodiments of this disclosure include near infrared (NIR) dyes, image recording media including the NIR dye, and methods of making the NIR dyes. One exemplary embodiment of a NIR dye, among others, includes: a silicon 2,3-naphthalocyanine derivative having the formula I:

Formula I wherein R is selected from $(CH_2CH_2O)_nR1$, $(CH_2CH(CH_3)O)_mR2$, and combinations thereof; wherein n is 2 to 20; wherein R1 is selected from a hydrocarbon having 1 to 10 carbon atoms; wherein m is 1 to 15; wherein R2 is selected from a hydrocarbon having from 1 to 10 carbon atoms; wherein $(CH_2CH_2O)_nR1$ is selected from a linear $(CH_2CH_2O)_nR1$ and a branched $(CH_2CH_2O)_nR1$; and wherein $(CH_2CH(CH_3)O)_mR2$ is selected from a linear $(CH_2CH(CH_3)O)_mR2$ and a branched $(CH_2CH(CH_3)O)_mR2$.

One exemplary embodiment of image recording substrate, among others, includes: a matrix, a color former, an activator, and a radiation-absorbing compound, wherein the radiation-absorbing compound includes a near infrared dye having formula I.

One exemplary embodiment of a method for preparing a near infrared dye, among others, includes: reacting 2,3-silicon naphthalocyanine dihydroxide with a monoether compound selected from: monoethers of polyethylene glycol, monoethers of polypropylene glycol, and monoethers of 1,2-propylene glycol in a solvent and producing the near infrared dye, wherein the near infrared dye has formula I.

BRIEF DESCRIPTION OF THE DRAWINGS

Many aspects of this disclosure can be better understood with reference to the following drawings. The components in the drawings are not necessarily to scale. Moreover, in the drawings, like reference numerals designate corresponding parts throughout the several views.

DETAILED DESCRIPTION

Embodiments of the present disclosure will employ, unless otherwise indicated, techniques of synthetic organic chemistry, ink chemistry, media chemistry, and the like, that are within the skill of the art. Such techniques are explained fully in the literature.

The following examples are put forth so as to provide those of ordinary skill in the art with a complete disclosure and description of how to perform the methods and use the compositions disclosed and claimed herein. Efforts have been made to ensure accuracy with respect to numbers (e.g., amounts, temperature, etc.) but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an" and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Discussion

Near infrared (NIR) dyes, coating layers including the NIR dyes, and substrates including coating layers are disclosed. In particular, the NIR dyes can be used in laser imageable coatings, as dyes for optical storage applications, and as dyes for photodynamic therapy (e.g., cancer therapy).

The NIR dyes are advantageous because the NIR dyes of the present disclosure have higher photostability relative to the majority of currently used NIR dyes. In addition, NIR dyes of the present disclosure have a low visible signature (i.e., low extinction of the visible light) and a strong NIR extinction compared to currently used NIR dyes. Furthermore, NIR dyes of the present disclosure have good solubility in medium polarity solvents and UV-curable monomers compared to majority of currently used NIR dyes.

Figure 1:
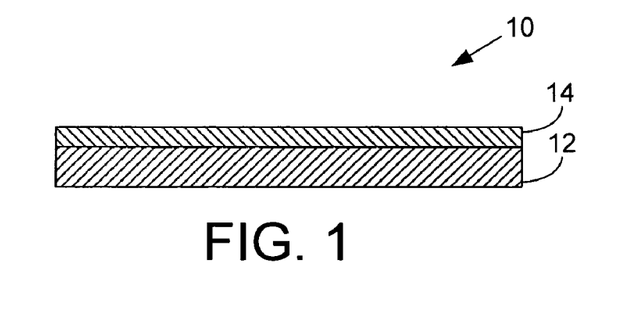
FIG. 1 illustrates an embodiment of an imaging medium.

FIG. 1 illustrates an embodiment of an imaging medium 10. The imaging medium 10 can include, but is not limited to, a substrate 12 and a coating layer 14 (e.g., that includes a NIR dye). The substrate 12 can be a substrate upon which it is desirable to make a mark, such as, but not limited to, paper (e.g., labels, tickets, receipts, or stationery), overhead transparencies, a metal/metal composite, glass, a ceramic, a polymer, and a labeling medium (e.g., a compact disk (CD) (e.g., CD-R/RW/ROM) and a digital video disk (DVD) (e.g., DVD-R/RW/ROM)).

In particular, the substrate 12 includes an "optical disk" which is meant to encompass audio, video, multi-media, and/or software disks that are machine readable in a CD and/or DVD drive, or the like. Examples of optical disk formats include writeable, recordable, and rewriteable disks such as DVD, DVD-R, DVD-RW, DVD+R, DVD+RW, DVD-RAM, CD, CD-ROM, CD-R, CD-RW, DVD-HD, Blu-ray, and the like. Other like formats can also be included, such as similar formats and formats to be developed in the future.

The coating layer 14 can include, but is not limited to, the matrix, the color former, the activator, the radiation-absorbing compound (e.g., a NIR dye), as well as other components typically found in the particular media to be produced.

The layer 14 may be applied to the substrate 12 via any acceptable method, such as, but not limited to, rolling, spraying, and screen-printing. In addition, one or more layers can be formed between the layer 14 and the substrate 12 and/or one or more layer can be formed on top of the coating layer 14. In one embodiment, the layer 14 is part of a CD or a DVD.

To form a mark, radiation energy is directed imagewise at one or more discrete areas of the layer 14 of the imaging medium 10. The form of radiation energy may vary depending upon the equipment available, ambient conditions, the desired result, and the like. The radiation energy can include, but is not limited to, infrared (IR) radiation, ultraviolet (UV) radiation, x-rays, and visible light. The radiation-absorbing compound (e.g., NIR dye in the case of NIR imaging laser) absorbs the radiation energy and heats the area of the layer 14 to which the radiation energy impacts. The heat may cause the color former and the activator to mix. The color former and the activator may then react to form a mark (color) on certain areas of the layer 14.

Figure 2:
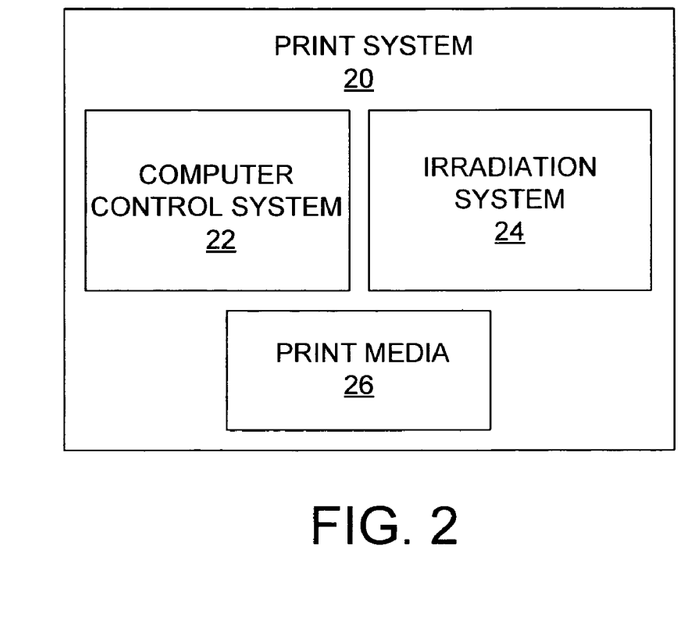
FIG. 2 illustrates a representative embodiment of a print system.

FIG. 2 illustrates a representative embodiment of a print system 20. The print system 20 can include, but is not limited to, a computer control system 22, an irradiation system 24, and print media 26 (e.g., imaging medium). The computer control system 22 is operative to control the irradiation system 24 to cause marks (e.g., printing of characters, symbols, photos, and the like) to be formed on the print media 26. The irradiation system 24 can include, but is not limited to, a laser system, UV energy system, IR energy system, visible energy system, x-ray system, and other systems that can produce radiation energy to cause a mark to be formed on the layer 14. The print system 20 can include, but is not limited to, a laser printer system and an ink-jet printer system. In addition, the print system 20 can be incorporated into a digital media system. For example, the print system 20 can be operated in a digital media system to print labels (e.g., the layer is incorporated into a label) onto digital media such as CDs and DVDs. Furthermore, the print system 20 can be operated in a digital media system to directly print onto the digital media (e.g., the layer is incorporated the structure of the digital media).

As mentioned above, the coating layer includes, but is not limited to, the matrix, the color former, the activator, and the radiation-absorbing compound. In an embodiment, the radiation absorbing compound is a NIR dye. The NIR dyes have a high (greater than about $0.1 \times 10^5$ ml*g$^{-1}$*cm$^{-1}$ or higher than about $0.5 \times 10^5$ ml*g$^{-1}$*cm$^{-1}$) molar extinction from about 770 to 800 nm, while also having a narrow absorption band (e.g., less than or equal to about 35 nm). In addition, the NIR dyes have a low visible signature (extinction of NIR peaks/extinction peaks in the visible range (about 400-700 nm) greater than about 5 or greater than about 7). Furthermore, the NIR dyes are soluble (e.g., greater than about 1 wt. % or greater than about 2 weight % of the NIR dye) in UV curable monomers of acrylate and/or methacrylate as well as other polymeriazable low molecular species that can be used in radiation-curable coating formulations (e.g., styrene and its derivatives). The UV curable monomers include, but are not limited to, hexamethylene diacrylate, tripropylene glycol diacrylate, lauryl acrylate, isobornyl acrylate, isodecyl acrylate, neopentyl glycol diacrylate, isobornyl acrylate, 2-phenoxyethyl acrylate, 2(2-ethoxy)ethylacrylate, polyethylene glycol diacrylate and other acrylated polyols, trimethylolpropane triacrylate, pentaerythritol tetraacrylate. Additionally, the NIR dyes have a relatively high photostability (i.e., lightfastness). For example, a dye dissolved in 7 μm thick acrylate coating results in loses less than about 50% of its original extinction after being exposed to ambient light of typical indoor intensity (about 400 Lux) for 90 days.

The NIR dyes include, but are not limited to, silicon 2,3-naphthalocyanines with medium polarity side chains (e.g., polyether side chains) attached to the central Si atom. Although not intending to be bound by theory, these sidechains improve solubility of the dye in medium polarity organic solvents such as UV-curable acrylates and methacrylates comprising components of majority modern UV-curable coating formulations. In an embodiment, the NIR dyes can include compounds having formula I:

Formula I

R can include, but is not limited to, (CH$_2$CH$_2$O)$_n$R1, (CH$_2$CH (CH$_3$)O)$_m$R2, and combinations thereof. Subscript n can be 2 to 20, or 2 to 10R1 can include a hydrocarbon having 1 to 10 carbon atoms, 1 to 5 carbon atoms, and 1 to 4 carbon atoms. In particular, R1 can include, but is not limited to, methyl, ethyl, propyl, iso-propyl, butyl, iso-butyl, and tert-butyl. In addition, (CH$_2$CH$_2$O)$_n$R1 can be a linear (CH$_2$CH$_2$O)$_n$R1 and/or a branched (CH$_2$CH$_2$O)$_n$R1. In particular, $(CH_2CH_2O)_nR1$ is a branched $(CH_2CH_2O)_nR1$, where the branching occurs at the end hydrocarbon and not in the alkoxy chain itself.

Subscript m can be 1 to 15 or 1 to 10. In particular, subscript m is 2 to 8. R2 can include a hydrocarbon having 1 to 10 carbon atoms and 1 to 5 carbon atoms. In particular, R2 can include, but is not limited to, methyl, ethyl, propyl, iso-propyl butyl, iso-butyl, and tert-butyl. In addition, $(CH_2CH(CH_3)O)_mR2$ can be a linear $(CH_2CH(CH_3)O)_mR2$ and/or a branched $(CH_2CH(CH_3)O)_mR2$. In particular, $(CH_2CH(CH_3)O)_mR2$ is a branched $(CH_2CH(CH_3)O)_mR2$.

The NIR dye can be about 0.1 wt % to 5 wt % of the coating layer, about 0.2 wt % to 3 wt % of the coating layer, and about 0.3 wt % to 2 wt % of the coating layer.

In general, the NIR dyes can be prepared by direct reaction of 2,3-silicon naphthalocyanine dihydroxide (2,3-NC—Si $(OH)_2$) with monoethers of polyethylene glycol and polypropylene glycol and preferably that of 1,2-propylene glycol in a solvent such as in mesitylene.

In an embodiment, the NIR dye is a compound having formula 1 where R equal to $(CH_2CH(CH_3)O)_mR2$. Subscript m is 3 to 6 and R2 is butyl group. In practice $(CH_2CH(CH_3)O)_mR2$ is a mixture of oligomers, where m is 3 to 6 with an average value between 4 and 5. In addition, $(CH_2CH(CH_3)O)_mR2$ is branched. The NIR dye has a molar extinction of about 397K I $mol^{-1}$ $cm^{-1}$ at about 773 nm, while also having a narrow absorption band of about 765 to 785 nm. In addition, the NIR dye has a low (highest extinction in visible range $0.25 \times 10^5$ $ml*g^{-1}*cm^{-1}$ at about 685 nm) visible signature (e.g., low absorption from about 400 to 700 nm). Furthermore, the NIR dye has a solubility of not lower than 2 weight % of the dye) in 1,6-hexanediol diacrylate. Additionally, the NIR dye has a relatively high photostability (i.e., lightfastness). The coating based on a 50/50 mixture of 1,6-hexanedioldiacrylate and isobornyl acrylate containing 1 wt. % of the dye showed a lower than 30% loss of extinction when being exposed to fluorescent light of 400 Lux intensity for 90 days.

The NIR dye was prepared through direct reaction of silicon 2,3-naphthalocyanine dihydroxide (Si-2,3-NC$(OH)_2$) with poly(propylene glycol)butyl ether having average Mn of about 340 in mesitylene as the reaction environment. The reaction yield was about 75%. The resulting dye had high molar extinction (about 397,790 I*$mol^{-1}$ $cm^{-1}$) comparable to that of bis(trihexylsiloxy)silicon 2,3-naphthalocyanine (about 500,000 I*$mol^{-1}$ $cm^{-1}$). In addition, the NIR dye also had a solubility in UV-curable acrylates (greater than about 2 wt. %) in 1,6-hexanediol diacrylate (SR238).

When being dissolved in UV-curable coatings dye showed significant photostability. For example, with a load of about 1 wt. % of dissolved NIR dye into the UV-curable coating based on 50/50 mixture of 1,6-hexanediol diacrylate and isobornyl acrylate. After being screen-printed onto CD surface at thickness about 7 μm the coating had light-greenish coloration. After about 72 hrs exposure of the coating to high intensity fluorescent light (21 kLux), the layer did not change significantly in coloration, which is a direct indication of the dye photostability.

It should be noted that the NIR dyes are described in conjunction with a coating layer for illustrative purposes only. As such, the NIR dyes can be used individually or in combination with other technologies such as, but not limited to, data recording dyes in optical storage applications, and photodynamic therapy.

The matrix can include compounds capable of and suitable for dissolving and/or dispersing the radiation absorbing compound, the activator, and/or the color former. The matrix can include, but is not limited to, UV curable monomers, oligomers, and pre-polymers (e.g., acrylate derivatives. Illustrative examples of UV-curable monomers, oligomers, and pre-polymers (that may be mixed to form a suitable UV-curable matrix) can include but are not limited to, hexamethylene diacrylate, tripropylene glycol diacrylate, lauryl acrylate, isodecyl acrylate, neopentyl glycol diacrylate, 2-phenoxyethyl acrylate, 2(2-ethoxy)ethylacrylate, polyethylene glycol diacrylate and other acrylated polyols, trimethylolpropane triacrylate, pentaerythritol tetraacrylate, ethoxylated bisphenol A diacrylate, acrylic oligomers with epoxy functionality, and the like.

In an embodiment the matrix is used in combination with a photo package. A photo package may include, but is not limited to, a light absorbing species, which initiates reactions for curing of a matrix such as, by way of example, benzophenone derivatives. Other examples of photoinitiators for free radical polymerization monomers and pre-polymers include, but are not limited to, thioxanethone derivatives, anthraquinone derivatives, acetophenones and benzoine ether types, and the like.

It may be desirable to choose a matrix that is cured by a form of radiation other than the type of radiation that causes a color change. Matrices based on cationic polymerization resins may include photo-initiators based on aromatic diazonium salts, aromatic halonium salts, aromatic sulfonium salts and metallocene compounds, for example. An example of a matrix may include Nor-Cote CDG000. Other acceptable matrices may include, but are not limited to, acrylated polyester oligomers (e.g., CN293 and CN294, available from Sartomer Co.).

The matrix compound is about 2 wt % to 98 wt % of the coating layer and about 20 wt % to 90 wt % of the coating layer.

As mentioned above, color formers can be included in the coating layer. The color formers can include, but are not limited to, leuco dyes and phthalide color formers (e.g., fluoran leuco dyes and phthalide color formers as described in "The Chemistry and Applications of Leuco Dyes", Muthyala, Ramiah, ed., Plenum Press (1997) (ISBN 0-306-45459-9), which is incorporated herein by reference).

The color forming composition can include, but is not limited to, a wide variety of leuco dyes. Suitable leuco dyes include, but are not limited to, fluorans, phthalides, aminotriarylmethanes, aminoxanthenes, aminothioxanthenes, amino-9,10-dihydro-acridines, aminophenoxazines, aminophenothiazines, aminodihydro-phenazines, aminodiphenylmethanes, aminohydrocinnamic acids (cyanoethanes, leuco methines) and corresponding esters, 2(p-hydroxyphenyl)-4,5-diphenylimidazoles, indanones, leuco indamines, hydrozines, leuco indigoid dyes, amino-2,3-dihydroanthraquinon-es, tetrahalo-p,p'-biphenols, 2(p-hydroxyphenyl)-4,5-diphenylimidazoles, phenethylanilines, phthalocyanine precursors (such as those available from Sitaram Chemicals, India), and other known leuco dye compositions. Experimental testing has shown that fluoran based dyes are one class of leuco dyes which exhibit particularly desirable properties.

In one aspect of the present disclosure, the leuco dye can be a fluoran, phthalide, aminotriarylmethane, or mixture thereof. Several non-limiting examples of suitable fluoran based leuco dyes include 3-diethylamino-6-methyl-7-anilinofluorane, 3-(N-ethyl-p-toluidino)-6-meth-yl-7-anilinofluorane, 3-(N-ethyl-N-isoamylamino)-6-methyl-7-anilinofluoran-e, 3-diethylamino-6-methyl-7-(o,p-dimethylanilino)fluorane, 3-pyrrolidino-6-methyl-7-anilinofluorane, 3-piperidino-6-methyl-7-anilino-fluorane, 3-(N-cyclohexyl-N-methylamino)-6-methyl-7-anilinofluorane, 3-diethylamino-7-(m-trifluoromethylanilino)fluorane, 3-dibutylamino-6-methyl-7-anilinofluorane, 3-diethylamino-6-chloro-7-anilinofluorane, 3-dibutylamino-7-(o-chloroanilino)fluorane, 3-diethylamino-7-(o-chloroanilino)fluorane, 3-di-n-pentylamino-6-methyl-7-anilinofluoran, 3-di-n-butylamino-6-methyl-7-anilinofluoran, 3-(n-ethyl-n-isopentylamino)-6-methyl-7-anilinofluoran, 3-pyrrolidino-6-methyl-7-anilinofluoran, 1(3H)-isobenzofuranone,4,5,6,7-tetrachloro-3,3-bis[2-[4-(dimethylamino)phenyl]-2-(4-methoxyphenyl)ethenyl]-, 2-anilino-3-methyl-6-(N-ethyl-N-isoamylamino)fluorane (S-205 available from Nagase Co., Ltd), and mixtures thereof.

Suitable aminotriarylmethane leuco dyes can also be used in embodiments of the preset disclosure, such as tris(N,N-dimethylaminophenyl)methane (LCV), tris(N,N-diethylaminophenyl)methane (LECV), tris(N,N-di-n-propylaminophenyl)methane (LPCV), tris(N,N-di-n-butylaminophenyl) methane (LBCV), bis(4-diethylaminophenyl)-(4-diethylamino-2-methyl-phenyl)methane (LV-1), bis(4-diethylamino-2-methylphenyl)-(4-diethylamino-phenyl) methane (LV-2), tris(4-diethylamino-2-methylphenyl) methane (LV-3), bis(4-diethylamino-2-methylphenyl)(3,4-dimethoxy-phenyl)methane (LB-8), aminotriarylmethane leuco dyes having different alkyl substituents bonded to the amino moieties wherein each alkyl group is independently selected from C1-C4 alkyl, and aminotriaryl methane leuco dyes with any of the preceding named structures that are further substituted with one or more alkyl groups on the aryl rings wherein the latter alkyl groups are independently selected from C1-C3 alkyl. Other leuco dyes can also be used in connection with the present invention and are known to those skilled in the art. A more detailed discussion of some of these types of leuco dyes may be found in U.S. Pat. Nos. 3,658,543 and 6,251,571, each of which are hereby incorporated by reference in their entireties. Additional examples and methods of forming such compounds can be found in Chemistry and Applications of Leuco Dyes, Muthyala, Ramaiha, ed., Plenum Press, New York, London, ISBN: 0-306-45459-9, which is hereby incorporated by reference.

The color former can be about 3 wt % to 35 wt % of the coating layer, about 10 wt % to 30 wt % of the coating layer, and about 10 wt % to 20 wt % of the coating layer.

In addition to the NIR dye, the coating layer may include additional radiation absorbing compounds. The additional radiation absorbing compounds readily absorb a desired specific wavelength of the marking radiation. The radiation absorbing compound may be a material that effectively absorbs the type of energy to be applied to the print substrate 16 to effect a mark or color change. The radiation absorbing compound can include, but is not limited to, IR780 (Aldrich 42,531-1) (1) (3H-Indolium, 2-[2-[2-chloro-3-[(1,3-dihydro-3,3-dimethyl-1-propyl-2H-indol-2-ylidene)ethylidene]-1-cyclohexen-1-yl]ethenyl]-3,3-dimethyl-1-propyl-, iodide (9Cl)); IR783 (Aldrich 54,329-2) (2) (2-[2-[2-Chloro-3-[2-[1,3-dihydro-3,3-dimethyl-1-(4-sulfobutyl)-2H-indol-2-ylidene]-ethylidene]-1-cyclohexen-1-yl]-ethenyl]-3,3-dimethyl-1-(4-sulfobutyl)-3H-indolium hydroxide, inner salt sodium salt); Syntec 9/1 (3)); Syntec 9/3 (4); or metal complexes (e.g., dithiolane metal complexes (5) and indoaniline metal complexes (6)).

where $M_1$ is a transition metal, $R_1$, $R_2$, $R_3$, and $R_4$ are alkyl or aryl groups with or without halo substituents, and $A_1$, $A_2$, $A_3$, and $A_4$ can be S, NH, or Se;

where $M_2$ is Ni or Cu and $R_5$ and $R_6$ are aryl or alkyl groups with or without halo substituents.

Additional examples of radiation absorbing compounds can be found in "Infrared Absorbing Dyes", Matsuoka, Masaru, ed., Plenum Press (1990) (ISBN 0-306-43478-4) and "Near-infrared Dyes for High Technology Applications", Daehne, S.; Resch-Genger, U.; Wolfbeis, O., Ed., Kluwer Academic Publishers (ISBN 0-7923-5101-0), both incorporated herein by reference.

The radiation absorbing compound can be about 0.2 wt % to 5 wt % of the coating layer, about 0.2 wt % to 2 wt % of the coating layer, and about 0.2 wt % to 0.6 wt % of the coating layer.

As used herein, the term "activator" is a substance that reacts with a color former, causing the color former to alter its chemical structure and change or acquire color.

The activator can include a compound that has an acid such as, but not limited to, a Lewis acid, has a functionality such as a complexed transition metal, metal salt, phenolic compound, and combinations thereof, and can be reactive with leuco dyes with or without introduction of energy in the form of light and/or heat.

In one embodiment, the activator can be a metal salt of an aromatic carboxylic acid. The metal of the metal salt can include, but is not limited to, transition metals such as zinc, tin, nickel, iron, and other transition metals. In one embodiment, the metal salt activator can be a zinc salt of an aromatic carboxylic acid. Other metal salt activators include zinc salicylate, tin salicylate, zinc 2-hydroxy naphthoate, 3,5-di-α-methylbenzyl zinc salicylate, metal salts of rhodanate, xanthate, aluminate, titanate, and zirconate, and mixtures thereof.

The activator can include, but is not limited to, a phenolic resin, zinc chloride bisphenol, hydroxybenzoate, amidophenol, anilides with hydroxyl groups, and benzoamides with hydroxyl groups including N-(4-Hydroxyphenyl)acetamide, 2-acetamidophenol, 3-acetamidophenol, salicylanilide, p-hydroxybenzamide, p-hydroxyphenyl acetamide, 3-hydroxy-2-napthanilide, o-hydroxybenzanilide, 4-hydroxyphenyl sulfone, 2,4'-dihydroxydiphenyl sulfone, Bis(4-hydroxy-3-allylphenyl)sulfone, 2,2',5,5'-Tetrahydroxy diphenyl sulfone, 4-hydroxyphenyl-4'-isopropoxyphenly sulfone, 2,2-Bis(4-hydroxyphenyl)propane, and combinations thereof.

The activator can be about 2 wt % to 20 wt % of the coating layer, about 2 wt % to 15 wt % of the coating layer, and about 2 wt % to 10 wt % of the coating layer.

The crosslinking agent can include, but is not limited to, aldehyde compounds (e.g., formaldehyde, glyoxal and glutaraldehyde); ketone compounds (e.g., diacetyl and cyclopentanedione); active halogen compounds (e.g., bis(2-chloroethylurea)-2-hydroxy-4,6-dichloro-1,3,5-triazine and 2,4-dichloro-6-s-triazine sodium salt); active vinyl compounds (e.g., divinyl sulfonic acid, 1,3-vinylsulfonyl-2-propanol, N,N'-ethylene-bis(vinylsulfonylacetamide), and 1,3,5-triacryloyl-hexahydr-o-s-triazine); N-methylol compounds (e.g., dimethylolurea and methyloldimethylhydantoin); melamine resins (e.g., methylolmelamine and alkylated methylolmelamine); epoxy resins; isocyanate compounds (e.g., 1,6-hexamethylenediisocyanate); aziridine compounds disclosed in U.S. Pat. Nos. 3,017,280 and 2,983,611; carboxyimide compounds disclosed in U.S. Pat. No. 3,100,704 which are incorporated herein by reference; epoxy compounds (e.g., glycerol triglycidyl ether); ethyleneimino compounds (e.g., 1,6-hexamethylene-N,N'-bis-ethyleneurea); halogenated carboxyaldehyde compounds (e.g., mucochloric acid and mucophenoxychloric acid); dioxane compounds (e.g., 2,3-dihydroxydioxane); metal-containing compounds (e.g., titanium lactate, aluminum sulfate, chromium alum, potassium alum, zirconyl acetate and chromiumacetate); polyamine compounds (e.g., tetraethylenepentamine); hydrazide compounds (e.g., adipic dihydrazide); and low molecular weight compounds and polymers having 2 or more oxazoline groups.

The crosslinking agent can be about 0.5 wt % to 2 wt % of the coating coating layer, about 0.2 wt % to 1 wt % of the coating layer, and about 0.2 wt % to 0.75 wt % of the coating layer.

Surfactants can also be present, such as alkyl polyethylene oxides, alkyl phenyl polyethylene oxides, polyethylene oxide (PEO) block copolymers, acetylenic PEO, PEO esters, PEO amines, PEO amides, and dimethicone copolyols. If used, such surfactants can be about 0.5 wt % to 5 wt % of the coating layer, about 0.5 wt % to 2.5 wt % of the coating layer, and about 0.5 wt % to 1 wt % of the coating layer.

While embodiments of the present disclosure are described in connection with the Examples and the corresponding text and figures, there is no intent to limit the disclosure to the embodiments in these descriptions. On the contrary, the intent is to cover all alternatives, modifications, and equivalents included within the spirit and scope of embodiments of the present disclosure.

EXAMPLE 1

Preparation of 2,3-NC—Si Radiation Absorber:

About 2.32 g of NcSi(OH)$_2$ (2,97 mmol) was boiled in about 300 ml mesitylene with a water trap over 3 hours. The solution of poly(propylene glycol)butyl ether with an average $M_n$ of about 340 (20 g, 58,8 mmol, Aldrich N 438103) in mesitylene (20 ml) was added and the mixture was refluxed for 24 hours. Then, the reaction mixture was cooled, unreacted NcSi(OH)$_2$ (800 mg) was filtered off and the filtrate was concentrated in vacuum. The residue was dissolved in ethanol and precipitated with water. The formed precipitate was filtered off, washed three times with 70% ethanol, and dried. Chromatographic separation on a short column with SiO$_2$ gave 2.2 g of compound Nc237 (about 75%). The dye Nc237 is a mixture about 6 main compounds with $R_f$ 0,2-0,5 (EtOAc:toluene=1:5).

Preparation of Laser-imageable Coating:

The image recording coating can be prepared by dissolving the Bisphenol S in the UV-curable monomer mix to form a first solution. Then, the other soluble components (e.g., Nc237, D8, SDP, Pergafast-201, and Irgacure-1300) are dissolved in the mixture. Subsequently, Foamblast-20F is added to the mixture. Finely-milled BK400 leuco-dye and YKR-5010 are dispersed in the mixture (using 3-roll milling).

|  | wt % |
|---|---|
| Coating with improved photostability/marking sensitivity | |
| UV-curable monomer mix | 50% |
| BK400 Leuco-dye (milled down to 0.3-0.4 μm) | 25% |
| Nc237 radiation absorber (prepared as described above) | 1% |
| 4-Hydroxy-4'-isopropoxydiphenyl sulfone (D8) (phenolic developer) | 6% |
| Bisphenol S (phenolic developer) | 4% |
| Irgacure-1300 (photoinitiator) | 6.5% |
| Pergafast-201 (sulfonylurea developer) | 4% |
| Foamblast-20F | 2% |
| YKR-5010 stable NIR pigment | 1.5% |
| Total | 100% |
| UV-curable monomer mix | |
| SR238 | 25% |
| SR506 | 35% |
| Ebecryl-605 | 26% |
| SR306HP | 14% |
| Total | 100% |

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include ±1%, ±2%, ±3%, ±4%, ±5%, ±6%, ±7%, ±8%, ±9%, or ±10%, or more of the numerical value(s) being modified. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

What is claimed is:

1. A near infrared (NIR) dye comprising:
   a silicon 2,3-naphthalocyanine derivative having the formula I:

Formula I wherein R is $(CH_2CH(CH_3)O)_mR2$; wherein m is 3 to 6; wherein R2 is selected from a hydrocarbon having from 6 to 10 carbon atoms.

2. The NIR dye of claim 1, wherein $(CH_2CH(CH_3)O)_mR2$ is a linear $(CH_2CH(CH_3)O)_mR2$.

3. The NIR dye of claim 1, wherein $(CH_2CH(CH_3)O)_mR2$ is a branched $(CH_2CH(CH_3)O)_mR2$.

4. A method for preparing a near infrared dye, the method comprising:
   reacting 2,3-silicon naphthalocyanine dihydroxide with a monoether compound selected from: monoethers of polyethylene glycol, monoethers of polypropylene glycol, and monoethers of 1,2-propylene glycol in a solvent; producing the near infrared dye, wherein the near infrared dye has formula I:

Formula I wherein R is $(CH_2CH(CH_3)O)_mR2$; wherein m is 3 to 6; wherein R2 is a butyl group.

5. The method of claim 4, wherein $(CH_2CH(CH_3)O)_mR2$ is a branched $(CH_2CH(CH_3)O)_mR2$.

6. The method of claim 4, further comprising, applying the near infrared dye to a substrate.

7. The method of claim 4, further comprising, applying the near infrared dye to a paper medium.

8. The method of claim 4, further comprising, applying the near infrared dye to a transparency.

9. The method of claim 6, further comprising, applying the near infrared dye to an optical disk.

10. A method for preparing a near infrared dye, the method comprising:
    reacting 2,3-silicon naphthalocyanine dihydroxide with a monoether compound selected from: monoethers of polyethylene glycol, monoethers of polypropylene glycol, and monoethers of 1,2-propylene glycol in a solvent; producing the near infrared dye, wherein the near infrared dye has formula I:

Formula I wherein R is $(CH_2CH(CH_3)O)_mR2$; wherein m is 3 to 6; wherein R2 is selected from a hydrocarbon having from 6 to 10 carbon atoms.

11. The method of claim 10, wherein $(CH_2CH(CH_3)O)_mR2$ is a branched $(CH_2CH(CH_3)O)_mR2$.

12. The method of claim 10, further comprising, applying the near infrared dye to a substrate.

13. The method of claim 10, further comprising, applying the near infrared dye to a paper medium.

14. The method of claim 10, further comprising, applying the near infrared dye to a transparency.

15. The method of claim 12, further comprising, applying the near infrared dye to an optical disk.

* * * * *

UNITED STATES PATENT AND TRADEMARK OFFICE
CERTIFICATE OF CORRECTION

PATENT NO. : 7,576,199 B2
APPLICATION NO. : 11/789018
DATED : August 18, 2009
INVENTOR(S) : Vladek Kasperchik et al.

It is certified that error appears in the above-identified patent and that said Letters Patent is hereby corrected as shown below:

In column 11, line 51, in Claim 1, delete "$(CH_2CH\,(CH_3)O)_mR2;$" and insert -- $(CH_2CH(CH_3)O)_mR2;$ --, therefor.

In column 11, line 55, in Claim 2, delete "$(CH_2CH\,(CH_3)O)_mR2$" and insert -- $(CH_2CH(CH_3)O)_mR2$ --, therefor.

In column 11, line 56, in Claim 2, delete "$(CH_2CH\,(CH_3)O)_mR2.$" and insert -- $(CH_2CH(CH_3)O)_mR2.$ --, therefor.

In column 11, line 57, in Claim 3, delete "$(CH_2CH\,(CH_3)O)_mR2$" and insert -- $(CH_2CH(CH_3)O)_mR2$ --, therefor.

In column 11, line 58, in Claim 3, delete "$(CH_2CH\,(CH_3)O)_mR2.$" and insert -- $(CH_2CH(CH_3)O)_mR2.$ --, therefor.

In column 12, line 25, in Claim 4, delete "$(CH_2CH\,(CH_3)O)_mR2;$" and insert -- $(CH_2CH(CH_3)O)_mR2;$ --, therefor.

In column 12, line 27, in Claim 5, delete "$(CH_2CH\,(CH_3)O)_mR2$" and insert -- $(CH_2CH(CH_3)O)_mR2$ --, therefor.

In column 12, line 28, in Claim 5, delete "$(CH_2CH\,(CH_3)O)_mR2.$" and insert -- $(CH_2CH(CH_3)O)_mR2.$ --, therefor.

In column 13, line 1, in Claim 10, delete "$(CH_2CH\,(CH_3)O)_mR2;$" and insert -- $(CH_2CH(CH_3)O)_mR2;$ --, therefor.

In column 13, lines 4-5, in Claim 11, delete "$(CH_2CH\,(CH_3)O)_mR2$" and insert -- $(CH_2CH(CH_3)O)_mR2$ --, therefor.

Signed and Sealed this
Twenty-ninth Day of March, 2011

David J. Kappos
*Director of the United States Patent and Trademark Office*

CERTIFICATE OF CORRECTION (continued)
U.S. Pat. No. 7,576,199 B2

In column 13, line 5, in Claim 11, delete "$CH_2CH(CH_3)O)_mR2$." and insert -- $(CH_2CH(CH_3)O)_mR2.$ --, therefor.